United States Patent
Nair et al.

(10) Patent No.: US 6,366,320 B1
(45) Date of Patent: *Apr. 2, 2002

(54) HIGH SPEED READOUT ARCHITECTURE FOR ANALOG STORAGE ARRAYS

(75) Inventors: Rajendran Nair; Mark A. Beiley, both of Chandler; Morteza Afghahi, Tempe, all of AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/987,131

(22) Filed: Dec. 8, 1997

(51) Int. Cl.[7] .............................................. H04N 5/335

(52) U.S. Cl. ...................................... 348/300; 348/308

(58) Field of Search ................................ 348/294, 311, 348/312, 315, 316, 317, 320, 322, 241, 306, 300, 308; 378/98.8, 98.11

(56) References Cited

U.S. PATENT DOCUMENTS

| | | | |
|---|---|---|---|
| 4,237,383 A | * 12/1980 | Kosonocky et al. | 348/317 |
| 4,322,752 A | * 3/1982 | Bixby | 348/312 |
| 4,734,583 A | * 3/1988 | Wang et al. | 348/306 |
| 4,862,276 A | * 8/1989 | Wang et al. | 348/306 |
| 5,351,309 A | * 9/1994 | Lee et al. | 382/22 |
| 5,471,515 A | | Fossum et al. | |
| 5,736,886 A | * 4/1998 | Mangelsdorf et al. | 348/241 |
| 5,877,715 A | * 3/1999 | Gowda | 348/312 |

OTHER PUBLICATIONS

D.M. Boisvert; MJ Gaboury: and R.B. Lloyd: An 8–10 but, 1–40 MHz Analog Signal Processor with Config. Performance for Elect. Imag.;1992;396–400.*

J.E.D. Hurwitz, Peter B. Denyer, Donald J. Baxter, Graham Townsend, "An 800K–Pixel Color CMOS Sensor for Consumer Still Cameras," SPIE vol. 3019, pp. 115–124.

Sunetra K. Mendis, Sabrina E. Kemeny, Russell C. Gee, Bedabrata Pain, Quiesup Kim and Eric R. Fossum, "Progress in CMOS Active Pixel Image Sensors," SPIE vol. 2172, pp. 19–29.

* cited by examiner

Primary Examiner—Tuan Ho
(74) Attorney, Agent, or Firm—Blakely, Sokoloff, Taylor & Zafman LLP (57) ABSTRACT

A semiconductor circuit having an analog storage array, a sense amplifier array in which each sense amp cell generates a differential signal pair in response to receiving first and second signals from the storage array. The circuit also includes an analog multiplexer through which a selected differential signal pair is driven into a signal processing pipe. In another embodiment, the sense amp cells each include an operational amplifier (opamp) pair configured as unity-gain closed loop amplifiers for driving the differential signal pair through the analog multiplexer. To improve settling time, the opamps are designed to provide an underdamped response while loaded with the analog transmission path through the analog mux. In yet another embodiment, each sense amp cell is activated one clock cycle before it is read. This allows speedy readout while transitioning from one cell to the next. Also, maintaining only two cells active at any given time during readout helps reduce power dissipation and substantially decouples power dissipation in the sense amp array from the size of the array. The embodiments of the invention can be used in different types of imaging systems, including for instance a digital camera.

19 Claims, 5 Drawing Sheets

HIGH SPEED READOUT ARCHITECTURE FOR ANALOG STORAGE ARRAYS

BACKGROUND

This invention is generally related to analog signal processing and more particularly to techniques for extracting information from semiconductor storage arrays.

Semiconductor storage arrays are used to store and generate analog signals. For instance, a random access memory (RAM) has an array of storage cells in which one bit of information is stored. Another type of storage array is a sensor array that has cells which electrically respond to incident radiation. Image sensor arrays, for example, respond to light which forms an image of a scene on the array. The image array typically has a large number of photocells or pixels, where the projected image is recorded by analog signals generated by the pixels. An example of a modern complimentary metal oxide semiconductor (CMOS) sensor array is discussed in Article 1, *Progress in CMOS Active Pixel Image Sensors,* S. K. Mendis, S. E. Kemeny, R. C. Gee, B. Pain, Q. Kim and E. R. Fossum, SPIE, Vol. 2172, pages 19–29. Examples of imaging systems that use image arrays include traditional applications such as video cameras and copiers to more modern ones such as the facsimile machine, scanner, medical imaging device, and the digital camera. The Article 2, *An 800K-Pixel Color CMOS Sensor for Consumer Still Cameras,* J. E. D. Hurwitz, P. B. Denyer, D. J. Baxter, and G. Townsend, SPIE Vol. 3019, pages 115–124, describes an image sensor particularly suitable for digital cameras.

Modern imaging arrays can be very large, having as many as 1024×1024 pixels, with future arrays expected to be even larger. The size is needed to provide detailed images. A 1024×1024 array for instance generates over 1 million different analog signals to represent an image frame. The large number of signals thus presents the circuit designer with some problems which need to be addressed in order to improve overall imaging system performance. These include pixel signal readout speed and overall power consumption.

The readout speed is related to how fast the individual analog signals can be separated from all of the other signals produced by the array, passed through an analog transmission path, and fed to a signal processing pipe. The faster each signal pair is fed into the pipe, the greater the image frame rate. Greater image frame rate in turn facilitates capturing motion in the scene.

In addition to readout speed as an area of improvement, power consumption is also a major concern for at least two reasons. First, portable imaging systems such as modern digital cameras normally use batteries which have a limited source of energy. Thus, reducing power consumption in such systems extends battery life and leads to a more attractive consumer product. Second, imaging arrays and their associated readout circuitry are now being built on the same semiconductor die in order to reduce manufacturing costs. Examples include imaging arrays built using standard complimentary metal oxide semiconductor (CMOS) fabrication processes. When readout circuitry and pixels are built on the same die, the power dissipated by the readout circuitry heats the pixels. Heating the pixels in turn increases leakage currents within each pixel, and as a result changes pixel response, typically resulting in undesirably brighter and less accurate images. The problem becomes worse in larger arrays if the power dissipated by the readout circuitry is tied to the array size.

In view of the above, there is a need for a readout architecture and method to be used with imaging arrays which optimizes readout speed and helps minimize power consumption.

SUMMARY

In a first embodiment, the invention features a semiconductor circuit having a storage array with a number of output lines. Each storage cell in the area generates first and second signals on a given output line. A sense amplifier array having a number of sense amplifier cells is coupled to the storage array, where each sense amp cell generates a differential signal pair in response to receiving the first and second signals on an output line.

The circuit also includes an analog multiplexer having first and second multiplexers (muxes), each mux having a number of inputs and one output, the first muxes receiving the differential signal pairs at their inputs. A subset of the first muxes are associated with a second mux. The inputs of the associated second mux are coupled to a number of outputs of the subset of the first muxes. Finally, control logic is provided for selecting a first mux from the subset and the associated second mux, to pass a single differential signal pair to be read out of the analog multiplexer.

In another embodiment, the sense amplifier cells are used to implement correlated double sampling (CDS) in an imaging apparatus. The sense amp cells form a row and are coupled to the bitlines of an image sensor array. An analog-to-digital converter unit is coupled to the analog mux for converting analog signals related to the differential signal pair into digital signals representing raw image data. A digital signal and image processing unit generates captured image data in response to receiving the digital signals. The captured image data is then transferred to a separate image processing system, such as a host computer. To orchestrate the events in the apparatus, a system controller is provided which can create the timing signals need for readout in response to instructions stored in firmware.

DETAILED DESCRIPTION

As briefly summarized above, one embodiment of the invention is directed at a multi-layer analog signal readout architecture having a storage array and a sense amplifier array feeding an analog multiplexer. In another embodiment, the sense amp cells of the sense amp array each include an operational amplifier (opamp) pair configured as unity-gain closed loop amplifiers for driving a differential signal pair through the analog multiplexer and into a signal processing pipe. To improve settling time of the signal pair at the signal processing pipe, the opamps are designed to provide an underdamped response while loaded with the analog transmission path to the signal processing pipe.

In yet another embodiment, each sense amp cell in the sense amp array is activated in response to either a Select signal or a Select_Ahead signal, or both. The Select_Ahead signal activates the cell, and the Select signal permits the cell to drive its differential signal pair into the analog mux. This allows speedy transitioning from one cell to the next as each cell is already activated at the point the Select signal is asserted. Also, maintaining only two cells active at any given time during readout helps reduce power dissipation, and substantially decouples power dissipation in the sense amp array from the size of the array thus making the architecture easily scalable.

Figure 1:
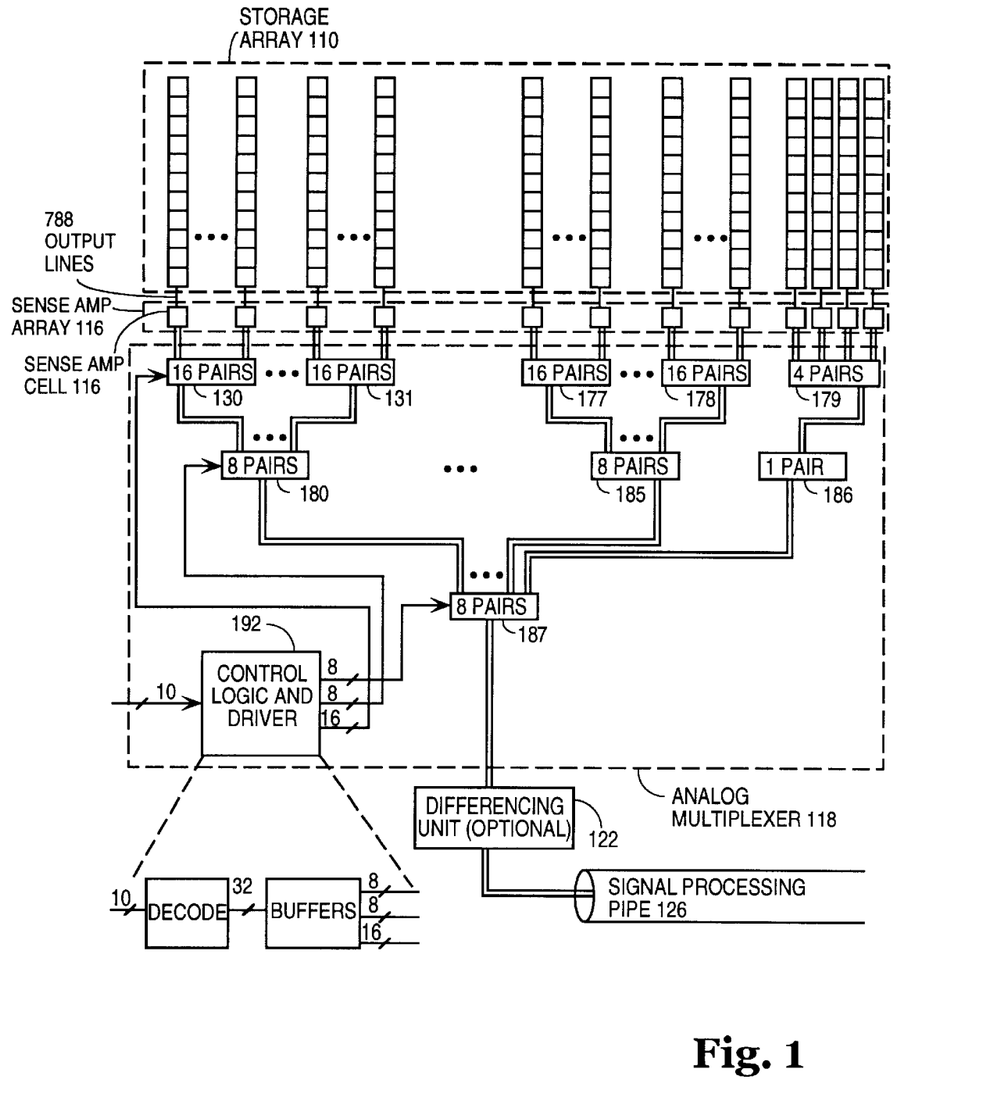
FIG. 1 illustrates an analog readout and multiplexing architecture according to a first embodiment of the invention.

FIG. 1 illustrates an architecture for analog signal readout from a storage array 110, according to a first embodiment of the invention. The architecture features an array of storage cells that are coupled to a sense amplifier array 114 through a number of output lines (788 are shown as an example). Each output line is coupled to a column of storage cells. Analog signals generated by the storage cells are fed to the sense amp array one row at a time through the output lines. Although shown as being read one row at a time, the analog signals can alternatively be read one column at a time, provided of course that each output line is coupled to a row of storage cells rather than a column.

The sense amp array is a row of sense amplifier cells, one sense amp cell 116 for each column as shown in FIG. 1. In the imaging system embodiment of the invention (discussed below in connection with FIG. 7), the sense amplifier cells implement correlated double sampling (CDS) of pixel signals. CDS as known to those skilled in the art is a technique used to reduce fixed pattern noise in pixel signals. Fixed pattern noise refers to errors in otherwise identical pixel signal values that are caused by manufacturing variations between the pixels. CDS requires sampling both the pre-exposure "reset value" and the post-exposure "exposed value" of each pixel signal. The two values are then transferred as a differential signal pair to a signal processing pipe. There the values are correlated (or simply subtracted) by specialized circuitry, or by software after being converted to digital format, to cancel the errors caused by differences between reset values and circuitry in the pixels of the manufactured array. Each sense amp cell 116 thus samples and holds two values from its corresponding column and drives them as a differential signal pair. After the two values have been sampled and stored in each sense amp cell 116 of an entire row, readout can continue on a column by column basis for the given row.

When a column is selected to be read, an analog transmission path is created through the analog multiplexer (mux) 118. The analog multiplexer 118 is made of a number of smaller multiplexers 130–189 arranged in multiple levels. In one embodiment, the smaller multiplexers include a number of switch pairs or pass gate pairs. Each pair can be a full CMOS transmission gate, a half gate, or any other device that acts as a switch to efficiently pass the differential signal pair received from the sense amp array 114.

The analog mux 118 has a number of different levels of multiplexers. For example, in selecting one of 788 output lines, three levels are used as shown in FIG. 1. A 10 bit column address (allowing 1024 different selections) is fed to control logic and driver left 192. The 10-bit address is predecoded into three different sets of selection signals, corresponding to the three different levels of multiplexers. The first level has 50 16-to-1 muxes 130–180 whose inputs receive the differential signals from the sense amplifier array. The single output of each 16-to-1 mux in the first level is fed to the inputs of 7 8-to-1 muxes 181–188 in the second level. Finally, the outputs of the second level muxes feed a single 8-to-1 mux 189.

In operation, the 10 bit column address is decoded to enable or select one of the 50 first level muxes 130–179, and one of the 7 second level muxes 180–186. The 32 predecoded lines selects one of 16 pass gate pairs in the selected first level mux, a corresponding one of 8 pass gate pairs in the selected second level mux, and finally a corresponding one of 8 pass gate pairs in the third level mux.

After being driven through the analog mux 118, the differential signal pair arrives at the optional differencing unit 122. In the imaging system embodiment of the invention, the differencing unit performs double difference sampling (DDS) as known to those skilled in the art. DDS is used to further reduce noise due to manufacturing variations from column to column of the sensor array, and in particular to reduce errors due to amplifier offsets in the sense amplifier (CDS) cells.

After being corrected by the differencing unit 122, the differential signal pair is finally fed into the signal processing pipe 126. There, the signal pairs for the entire array can be further amplified and converted sequentially into digital format using an analog-to-digital converter unit (not shown). Further digital processing can then be performed.

Figure 2:
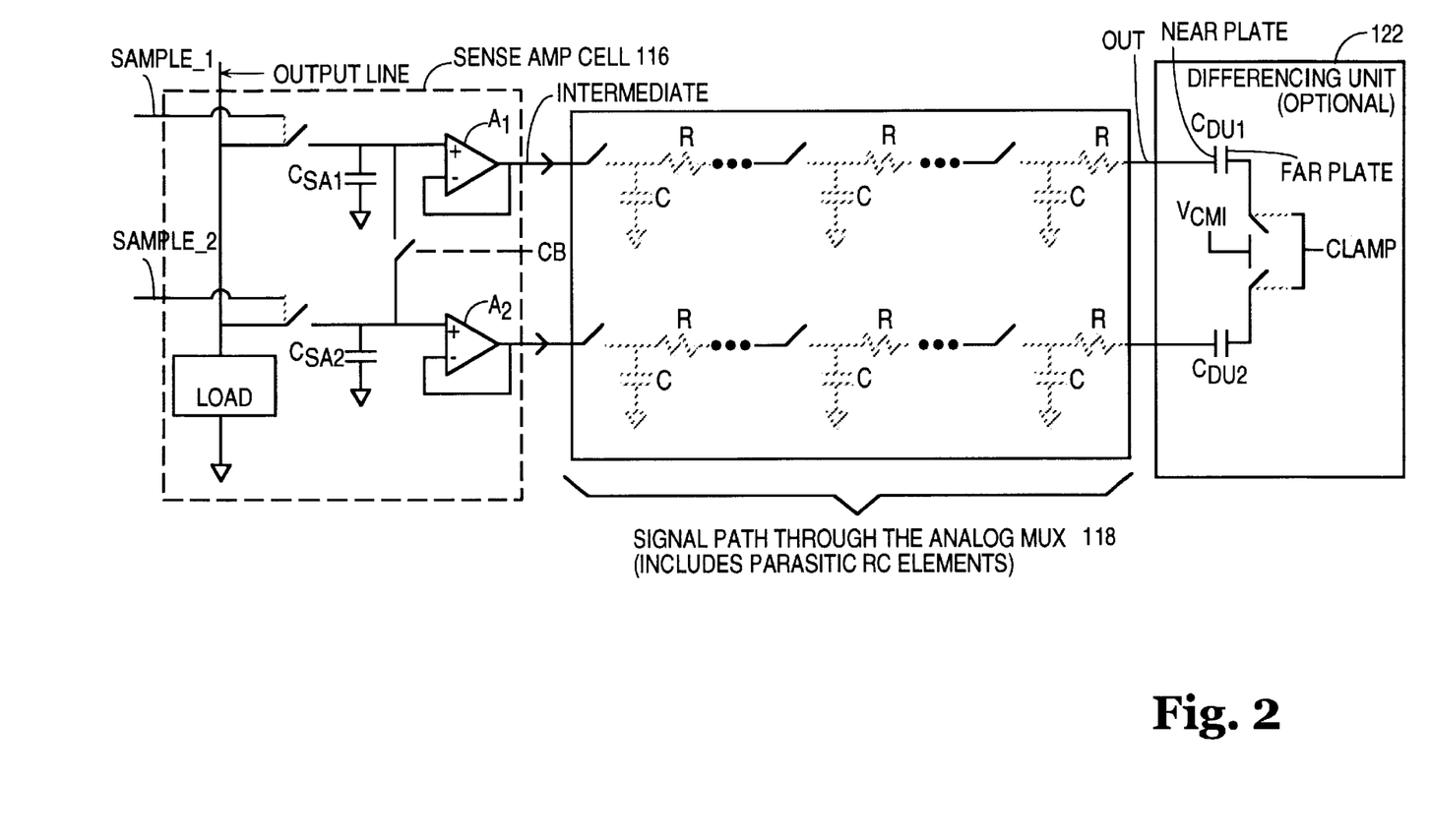
FIG. 2 illustrates the load presented to a sense amp cell for implementing another embodiment of the invention.
Figure 3:
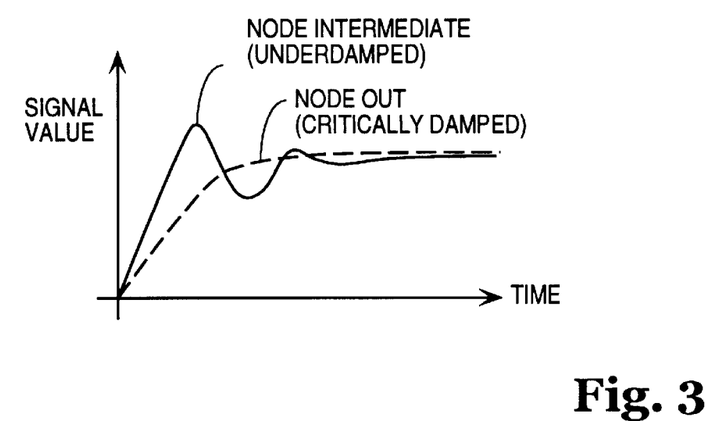
FIG. 3 shows signal behavior related to the sense amp cell of FIG. 2.

FIGS. 2 and 3 illustrate a further embodiment of the invention as an optimization to signal readout. The sense amp cell 116 in this embodiment includes a pair of operational amplifiers (opamps) $A_1$ and $A_2$ configured as unity-gain closed loop amplifiers. The amplifiers drive their respective input signals (voltages on capacitors $C_{SA1}$ and $C_{SA2}$ obtained by sampling the output line) through the analog mux 118 which is represented as several pairs of switches or gates that may include parasitic resistances (R) and capacitances (C). At least one and preferably both of the opamps is configured to yield an underdamped response at its output node (node "INTERMEDIATE") as shown in FIG. 3 when driving a signal through its load, the load being the signal path through analog multiplexer 118 and, optionally, into the differencing unit 122. Alternatively, the pair of opamps are configured to yield a critically damped response at the near plates of the capacitors $C_{DU1}$ and $C_{DU2}$ (node "OUT") in the optional differencing unit. Designing the opamp to give a critically damped response at the end of the signal path through the mux 112 rather than at its output node reduces the settling time of the signal at node OUT. The settling time may be defined in the context of a circuit's transient response as the time interval between the stimulus (activating the sense amp cell and creating a path through the analog mux) and its response (one or both of the differential signal pair settling to less than, for example, 0.1% of their steady state value).

A faster settling time for each differential signal pair in turn allows the entire storage array 110 to be read significantly more quickly, as the slightest reduction in settling time of the differential signal pair is multiplied by a very large number of cells in the storage array, e.g., 1 million for a 1024×1024 image sensor array, to give a significant speed advantage during readout of the entire array 110.

The speed advantage becomes more important when using both CDS and DDS to reduce fixed pattern noise, because DDS requires an additional readout cycle after the differential signal pair of exposed and reset values are read for each pixel. DDS normally operates in a two phase manner. First, the cell 116 drives the exposed and reset values while the CLAMP signal is asserted in the DDS unit 122 and predetermined common mode voltage $V_{CM1}$ is applied to the far plates (see FIG. 2). Next, CROWBAR (CB) is asserted short circuiting the inputs of opamps $A_1$ and $A_2$, and CLAMP is deasserted. Thus, in addition to the exposed and reset values, DDS causes an average of the exposed and reset values to be driven by the cell 116 into the DDS unit. The combination of using CLAMP and CB results in the reduction of errors caused by offsets in opamps $A_1$ and $A_2$, albeit requiring an additional readout cycle for each pixel.

Figure 4:
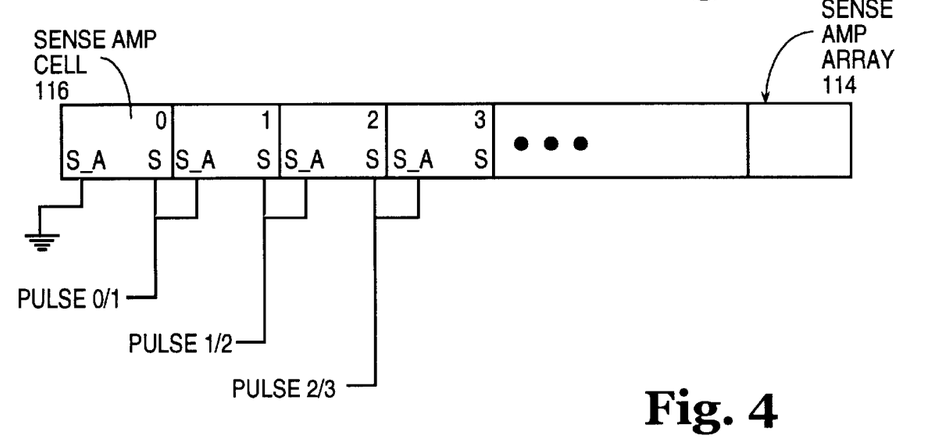
FIG. 4 illustrates a sense amp array according to another embodiment of the invention.
Figure 5:
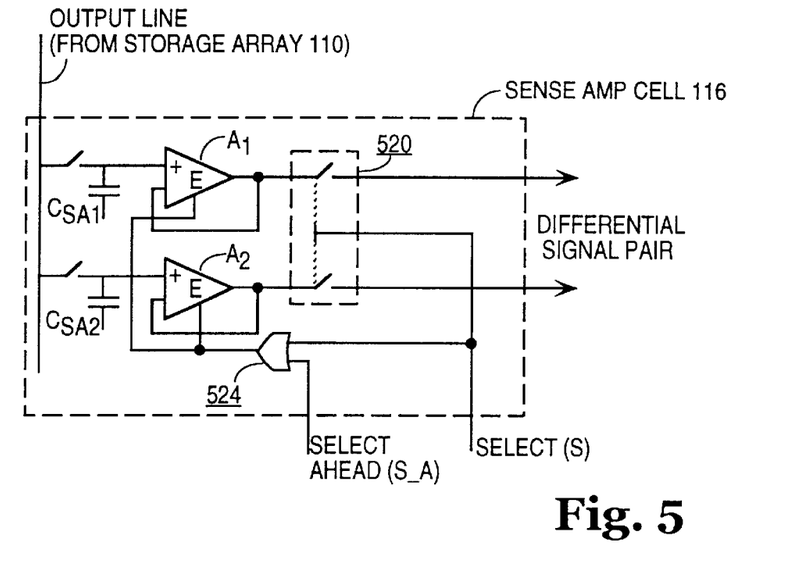
FIG. 5 is a circuit schematic of a sense amp cell used in the sense amp array of FIG. 4.
Figure 6:
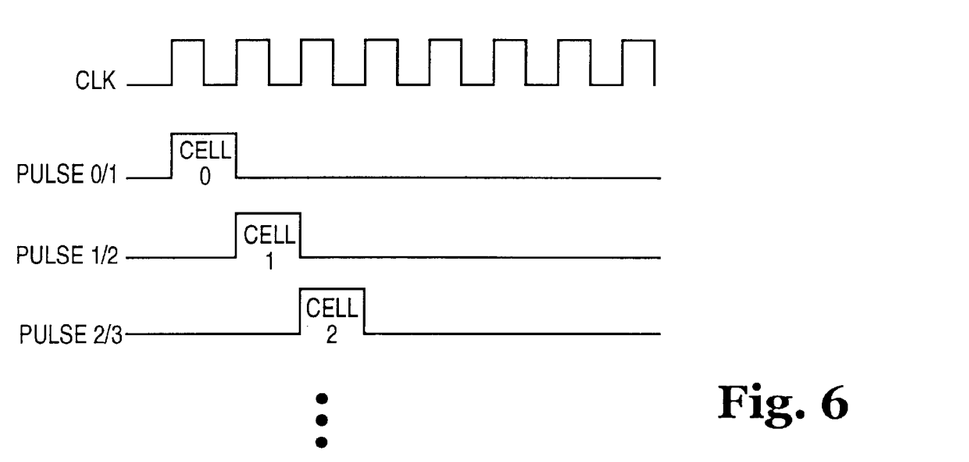
FIG. 6 is a timing diagram of the control signals that are applied to the sense amp array depicted in FIG. 4.

Turning now to yet another embodiment of the invention, FIGS. 4–6 show circuits and a related timing diagram that can be used to reduce power consumption in systems having large analog storage arrays 114 (see FIG. 1). This embodiment also yields a scalable readout architecture in which the increase in power consumption by going to a larger array is significantly less than in an architecture in which the entire sense amplifier array 114 is kept energized while the signals are driven into the analog mux 118 (see FIG. 1). The sense amp array 114 and timing signals are configured such that all but two of the sense amp cells at any given moment are kept inactive in order to reduce power consumption. The inactive state of each cell is defined as the state in which the cell consumes the least power while still being able to maintain the sampled signal pair values on the capacitors $C_{SA1}$ and $C_{SA2}$ until the values are read. For example, the opamps $A_1$ and $A_2$ in each cell feature an enable input that permits the opamp to be switched to a low power mode or even shut off in the inactive state.

The array 114 is read by sequentially activating a pair of adjacent sense amp cells. The sense amp cells can be configured as shown in FIG. 5. A switch pair 520 is provided in series with the amplifier output nodes, where the switch pair is controlled by the Select signal. An OR gate 524 receives the Select and Select_Ahead signals and controls the Enable input of the amplifiers. The Select and a Select_Ahead signal come from a timing signal generation circuit 708 (see FIG. 7). An exemplary timing diagram showing the Select and Select_Ahead signals as pulses is shown in FIG. 6 as referenced to a master clock and will be explained by the following example.

During the asserted phase of the 0/1 pulse, two events are occurring. First, the near cell (cell 0 of the 0/1 pair) is active and its opamps are driving a differential signal pair into the analog mux. At the same time, the far cell (cell 1 of the 0/1 pair) is active, but no signals are being driven from that cell, because its Select input is deasserted as shown by pulse 1/2.

In a subsequent cycle of the master clock, pulse 0/1 is deasserted (which deactivates cell 0) and pulse 1/2 is asserted to activate a subsequent pair of sense amp cells. The latter event both maintains cell 1 in the active state and activates cell 2. A new differential signal pair is thus driven only by cell 1. By selecting a far cell one master clock cycle ahead of the time during which the cell is expected to drive its differential signal pair, a speedy transition between cells is achieved. There may be a short time during which two adjacent pairs of cells are activated. Such an overlap should be minimized in order to further reduce power consumption.

Figure 7:
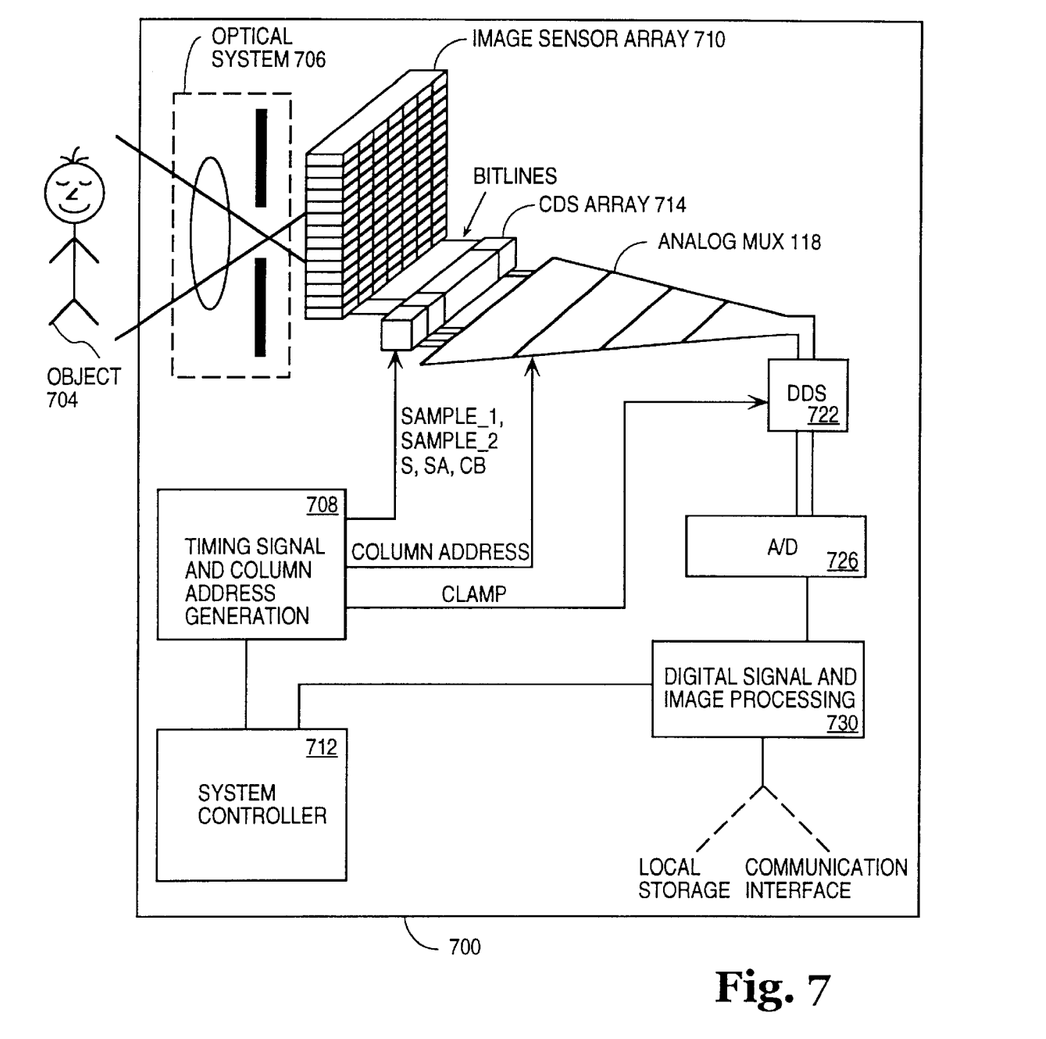
FIG. 7 shows an embodiment of the invention as an imaging apparatus being used to capture an image of an object in a scene.

The embodiments of the invention described above can be incorporated into an imaging apparatus 700 shown in logical block diagram form in FIG. 7. The apparatus 700 includes an image sensor array 710 that is part of an analog signal readout architecture that incorporates one or more of the embodiments illustrated in FIGS. 1–6 and described above. An optical system 706 having a lens and aperture is adjusted to project an image of an object onto a focal plane that contains the image sensor array 710. The image sensor array 710 provides a number of bit lines, one for each column of the array, that are used to transfer pixel signals to a correlated double sampling (CDS) array 714. The CDS array provides a differential signal pair for each column of the sensor array 710 and is used to readout the pixel signals one row at a time. The differential signal pairs for a row of the sensor array are then fed to an analog multiplexer 118. The analog multiplexer may have the configuration illustrated in FIG. 1 and described above. In addition, the technique of using a Select and a Select_Ahead signal to energize only a pair of adjacent CDS cells at a time can be used to further enhance the performance of the apparatus 700. The differential signal pairs are then sequentially fed to a double difference sampling (DDS) unit 722 where further noise reduction takes place.

After being corrected according to CDS and DDS, the differential signal pair may then be transferred to an analog-to-digital converter unit 726 to be converted into digital format. Finally, digital signal and image processing (DSIP) 730 is performed on the digital signals to obtain image data having a desired resolution. The DSIP 730 may include hardwired logic circuitry or a programmed high performance processor that performs color correction, scaling, and compression if desired to further reduce the size of the image data. The compressed image data may be transferred to a host computer through a communication interface that operates according to any one of known computer peripheral bus standards, such as Universal Serial Bus (USB) and IEEE 1394–1995. The apparatus 700 may optionally include a local storage device such as a removable memory card for non-volatile storage of the image data.

The overall operation of apparatus 700 may be managed by a system controller 712 that provides control and data signals to a timing signal and column address generation unit 708 as well as the DSIP unit 730. The system controller 712 may include a microcontroller, or a processor having an input/output interface, that responds to instructions stored in a non-volatile memory, e.g., firmware (not shown), in the system controller. The various timing signals Select and Select_Ahead used by the CDS array 714 and column addresses used by the analog multiplexer can be generated by hardwired logic circuitry within the timing signal and address generation unit 708. Alternatively, the system controller 712 may be enhanced to provide the timing signal and address generation functions itself.

To summarize, the invention has been described in terms of various embodiments of a readout architecture for an analog storage array. Beginning with a multi-layer analog multiplexer coupled to a sense amp array, further embodiments allow speed and power consumption improvements in the form of high speed unity gain amplifiers and Select_Ahead readout of a pair of sense amp cells at a time.

The embodiments of the invention described above are, of course, subject to other variations in structure and implementation. For example, different semiconductor fabrication processes can be used to implement the various embodiments, particularly standard CMOS which provides lower power consumption in the sensor array 710 than a charge coupled device (CCD) based sensor array. Therefore, the scope of the invention should be determined not by the embodiments illustrated but by the appended claims and their legal equivalents.

What is claimed is:

1. A method comprising:
   sampling outputs of sensor elements in a sensor array one row at a time by performing a)–d) while sampling each row as follows a) activating a current pair of sense amplifier cells coupled to the sensor array, the current pair having a near cell and a far cell, by causing the current pair to change from a low power consumption state to a high power consumption state; and then
b) driving at least one signal, which represents an output of a first sensor element in a row of the sensor array, from the near cell of the current pair; and then
c) activating a subsequent pair of sense amplifier cells coupled to the array, a near cell of the subsequent pair being the far cell of the current pair and a far cell of the subsequent pair being separate from the current pair of cells, by causing the far cell of the subsequent pair to change from a low power consumption state to a high power consumption state; and then
d) driving at least one signal, which represents an output of a second sensor element in said row from the near cell for the subsequent pair.

2. A method as in claim 1 further comprising deactivating the near cell of the current pair prior to driving the at least one signal from the near cell of the subsequent pair.

3. The method of claim 2 wherein said driving at least one signal from the near cell of the current pair comprises driving a differential signal pair.

4. A method as in claim 1 wherein said activating a current pair of sense amplifier cells comprises applying power to at least one operational amplifier in said current pair.

5. An imaging apparatus comprising:
image sensor array having a plurality of bitlines lines, each bitline coupled to a group of photocells in said sensor array, each photocell generating first and second signals on said bitline;
correlated double sampling (CDS) array having a plurality of CDS cells generating a plurality of differential signal pairs, each CDS cell being associated with one of said bitlines and providing one of said differential signal pairs in response to receiving first and second cell signals on its associated bitline, each CDS cell is activated by changing from a low power or power off mode to a high power mode in response to a signal being asserted by the imaging apparatus at either one of first and second control inputs of each cell, each CDS cell drives the associated differential signal pair in response to a signal being asserted at the first control input, but not the second control input;
analog multiplexer having first and second multiplexers (muxes), each mux having a plurality of inputs and one output, the first muxes receiving the differential signal pairs at their inputs, a subset of the first muxes having an associated second mux, the inputs of the associated second mux being coupled to a plurality of outputs of the subset of the first muxes, and control logic for selecting a first mux from the subset and the associated second mux to pass one of said differential signal pairs through the first and second mux and out of said analog multiplexer;
analog to digital converter unit coupled to the analog multiplexer for converting analog signals related to the differential signal pair into digital signals representing raw image data;
means for digital signal and image processing (DSIP), the means generating captured image data in response to receiving the digital signals; and output interface for transferring the captured image data to an image processing system separate from the imaging apparatus.

6. An imaging apparatus as in claim 5 wherein each CDS cell comprises
a pair of operational amplifiers (opamps) configured as unity gain closed loop amplifiers to drive the first and second signals, respectively, through the analog multiplexer.

7. An imaging apparatus as in claim 6 wherein at least one of said pair of opamps is configured to yield an underdamped response at its output node when driving the first signal through the analog multiplexer.

8. An imaging apparatus as in claim 1 further comprising an operational amplifier (opamp) pair in each CDS cell providing one of the plurality of differential signal pairs, each CDS cell being activated by applying power to the opamp pair in response to any one of the first control signal and the second control signal.

9. An imaging apparatus as in claim 5 further comprising
system controller for managing the operations of the apparatus in response to instructions stored in firmware.

10. An imaging apparatus as in claim 1 further comprising
timing signal generation unit that generates the first and the second signals.

11. An imaging apparatus as in claim 5 wherein the means for DSIP comprises hardwired logic circuitry.

12. A circuit comprising:
a plurality of amplifier cells, each amplifier cell being coupled to a respective one of a plurality of output lines of an analog storage array and having a signal input and a signal output, the signal input being coupled to said respective one of the output lines, each amplifier cell having first and second control inputs, each amplifier cell changes from a low power or power off mode to a high power mode in response to a control signal received at any one of the first and second control inputs, and drive the signal output in response to a control signal received at the second control input but not the first control input.

13. The circuit of claim 12 further comprising:
an amplifier in series with a switch coupled between the signal input and the signal output in each amplifier cell, the switch being coupled to the second control input and configured to close in response to the control signal received at the second input.

14. The circuit of claim 13 wherein the amplifier in each amplifier cell has a power supply input coupled to the first control input for being turned on in response to the control signal received at the first input.

15. The circuit of claim 12 wherein the signal output of each amplifier cell has dual lines to provide a differential output signal pair.

16. The circuit of claim 12 wherein the analog storage array includes photosensitive cells forming an image sensor array.

17. The circuit of claim 16 wherein the amplifier cells and the image sensor array are formed in the same integrated circuit die.

18. The circuit of claim 17 wherein the die is fabricated by a MOS process.

19. In an electronic system having a sensor array with a plurality of bitlines that are coupled to a plurality of amplifier cells, each cell being coupled to a respective bitline, a method for sampling outputs of sensor elements in the array, comprising:

activating each one of the plurality of amplifier cells sequentially one pair at a time, by causing each pair to change from a low power mode to a high power mode, each pair having a near cell and a far cell, the near cell of a pair being the same as the far cell of an adjacent pair; and while each pair is in the high power mode, driving a signal that represents an output of a separate sensor element in the array from the near cell and not the far cell of each pair.

* * * * *

UNITED STATES PATENT AND TRADEMARK OFFICE
CERTIFICATE OF CORRECTION

PATENT NO. : 6,366,320 B1
DATED : April 2, 2002
INVENTOR(S) : Nair et al.

It is certified that error appears in the above-identified patent and that said Letters Patent is hereby corrected as shown below:

Column 5,
Line 48, delete "dock", insert -- clock --.

Column 8,
Line 38, delete "drive", insert -- drives --.

Signed and Sealed this

Thirty-first Day of December, 2002

JAMES E. ROGAN
*Director of the United States Patent and Trademark Office*